United States Patent [19]

Gale

[11] Patent Number: 4,527,682
[45] Date of Patent: Jul. 9, 1985

[54] ADJUSTABLE CLUTCH PEDAL STOP

[75] Inventor: Ronald J. Gale, Hornchurch, United Kingdom

[73] Assignee: Ford Motor Company, Dearborn, Mich.

[21] Appl. No.: 560,009

[22] Filed: Dec. 9, 1983

[30] Foreign Application Priority Data

Dec. 24, 1982 [GB] United Kingdom ............ 8236756

[51] Int. Cl.³ ............................................. G05G 5/04
[52] U.S. Cl. ............................ 192/99 S; 192/110 R; 74/512; 74/526
[58] Field of Search .................... 192/99 S, 110 R; 74/512, 513, 526, 565; 180/315

[56] References Cited

U.S. PATENT DOCUMENTS 3,765,265 10/1973 Dzus, Jr. ............................... 74/526
3,788,438 1/1974 Reno ............................... 192/110 R
3,901,363 8/1975 De Grazia ....................... 192/110 R

FOREIGN PATENT DOCUMENTS 2910421 12/1979 Fed. Rep. of Germany ...... 180/315
2022210 12/1979 United Kingdom ........... 192/110 R Primary Examiner—Martin P. Schwadron
Assistant Examiner—Stephen M. Hepperle
Attorney, Agent, or Firm—Peter D. McDermott; Roger L. May

[57] ABSTRACT

An adjustable pedal stop for an automotive clutch includes a stop member 20 which is moved along a ratchet 32 by the first full depression of the clutch pedal 12. The ratchet prevents return movement of the stop member so that the pedal stop 25 is set to a position which ensures a predetermined normal pedal position irrespective of manufacturing tolerances.

10 Claims, 7 Drawing Figures

ADJUSTABLE CLUTCH PEDAL STOP

This invention related to a clutch pedal assembly for a motor vehicle.

Most modern motor vehicles have a clutch pedal which depends from a mounting bracket concealed by the vehicle instrument panel. The movement of the pedal in a direction to release the clutch is limited by engagement of the clutch pedal with the vehicle floor. Return movement of the clutch is limited by a pedal stop which defines the "normal" position of the clutch. Due to tolerances in the mounting of the pedal bracket on the vehicle, both in the pedal itself and in the position of the pedal stop relative to the pedal shaft, the "normal" pedal position may vary considerably from one vehicle to another. If the "normal" position is too far from the vehicle floor, the clutch may be awkward to operate and the excessive travel may overstress the clutch springs. If the "normal" position is too close to the vehicle floor, the clutch may not release fully.

The invention provides a clutch pedal stop which is set automatically to a consistent normal position upon initial full depression of the clutch pedal.

According to the present invention, there is provided a clutch pedal assembly comprising a pedal bracket, a pedal pivotably mounted on the pedal bracket, and a pedal stop member which in use defines the normal position of the pedal, characterised in that the pedal stop member is movable by the pedal upon initial depression of the pedal to a full travel position but restrained against return movement with the pedal whereby the pedal stop member is adjusted to a position in which it defines a normal position for the pedal having predetermined spatial relationship to the full travel position.

The invention will now be described further, by way of example, with reference to the accompanying drawings, in which.

Figure 1:
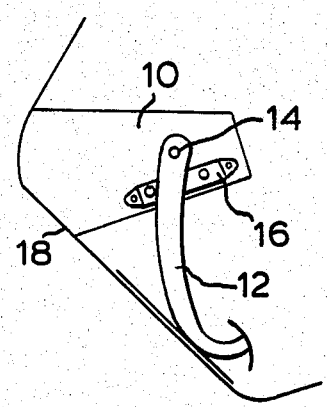
FIG. 1 is a side view of a first embodiment of the invention.
Figure 2:
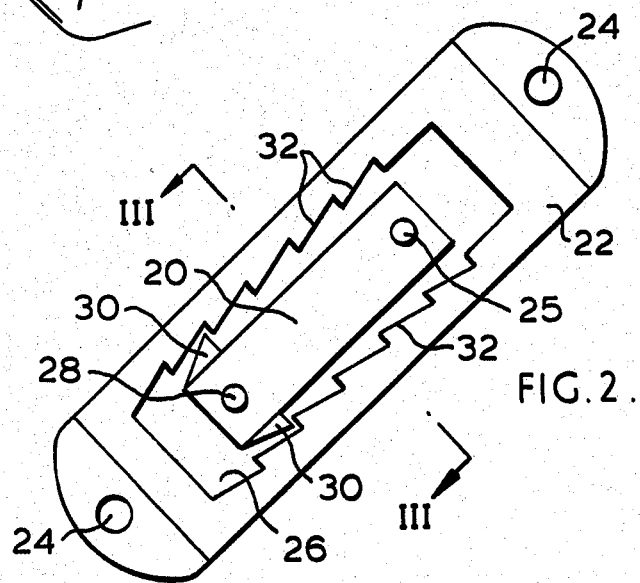
FIG. 2 is an enlarged side view of the pedal stop member and the stop member housing of the embodiment of FIG. 1.
Figure 3:
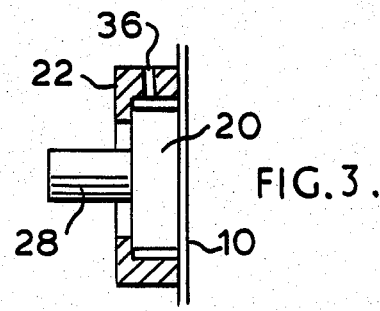
FIG. 3 is a section along the line III—III of FIG. 2.
Figure 4:
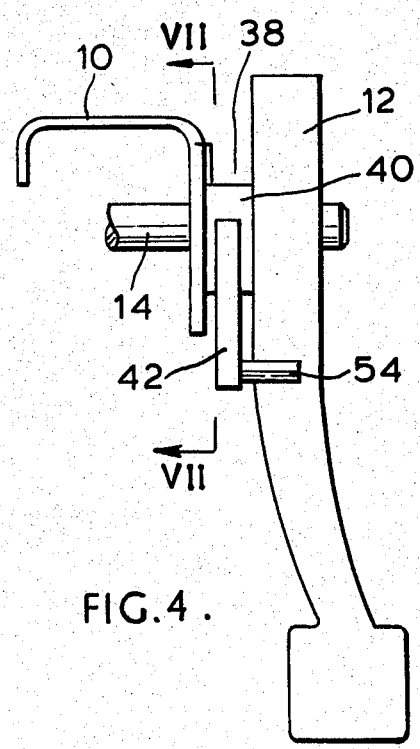
FIG. 4 is a front view of an alternative embodiment of the invention.
Figure 7:
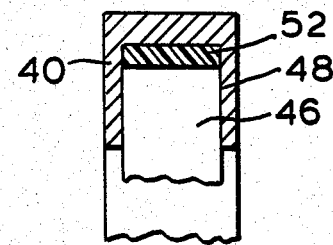
FIG. 7 is a fragmentary sectional view along the line VII—VII of FIG. 4.
Figure 5:
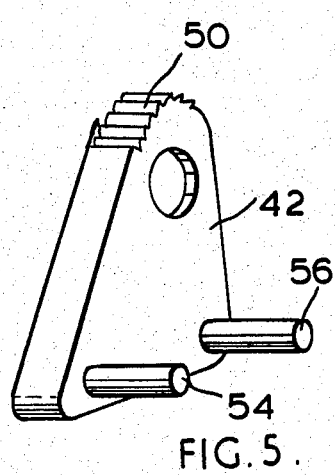
FIG. 5 is a perspective view of the pedal stop member of the embodiment of FIG. 4.
Figure 6:
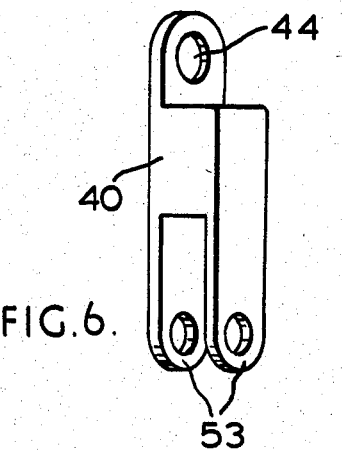
FIG. 6 is a perspective view of the pawl housing of the embodiment of FIG. 4.

Referring to FIG. 1, a clutch pedal assembly comprises a pedal bracket 10, a pedal 12 mounted on a pedal shaft 14, and an adjustable stop assembly 16.

The pedal bracket 10 is fixed to the vehicle 18. The pedal is connected to the vehicle clutch, for example by a clutch cable (not shown). A slack adjuster of the kind disclosed in out U.K. Patent Specification Nos. 1,181,920 and 1,411,467 may be used.

The stop assembly 16 comprises an elongate pedal stop member 20 slidably mounted in a stop housing 22 fixed, for example by rivetting through mounting holes 24, to the pedal bracket 10. A slot 26 in the housing 22 is of sufficient length to permit movement of the stop member to the correct position for all expected tolerance conditions of the assembly.

A pedal stop 25 is mounted at one end of the stop member 20 and projects therefrom to engage the rear face of the pedal 12 and limit rearward movement thereof.

An adjustment abutment 28 of similar shape to the pedal stop projects from the forward end of stop member 20 for engaging the forward face of the pedal 12.

The stop member is formed with teeth 30 which engage ratchet teeth 32 formed on the housing 22 permitting forward movement but preventing rearward movement of the stop member 20.

The spacing between the adjustment stop 28 and the pedal stop 25 is equal to the design pedal travel of the assembly plus the thickness of the pedal at its point of engagement with the pedal stop. The mechanism is assembled with the stop member at the rear of the slot.

In operation, the first full depression of the clutch pedal after assembly (the movement of the pedal being limited by engagement with the floor 34 of the vehicle) set 5 the stop member to its working position, the forward face 25 of the pedal engaging the adjustment abutment 28 to move the stop member forwards along the ratchet.

When the clutch pedal is released it returns until it engages the pedal stop 26. This stop position of the pedal is substantially the same position relative to the floor, irrespective of tolerances in the dimensions of the bulkhead, the bracket and the pedal itself.

The sides of the housing 22 may be slotted as shown at 36 to permit insertion of a tool for resetting the stop member to the rear end of the slot 26 when necessary in service.

In FIGS. 4 to 7, which show an alternative embodiment, the same reference numerals have been used to designate like parts and to avoid repetition these will not be described further.

The stop assembly 38 comprises a pawl housing 40 and a sector-shaped stop member 42 both mounted on the pedal shaft 14. The pawl housing 40 is located against rotation relative to the pedal bracket 10 by a bolt (not shown) which extends through a hole 44.

A pawl 46 is slidable mounted in a hollor upper portion 48 of the housing 40 and is urged downwardly into contact with ratchet teeth 50 on the stop member 42 by a rubber spring 52. The stop member 42 is located on the pedal shaft 14 between downwardly depending legs 53 formed by the bifurcated lower end of the housing 40.

An adjustment abutment pin 54 extends from a lower forward corner of the stop member 42 across the front of the pedal and a pedal stop pin 56 extends from a rearward lower corner of the stop member 42 across the rear of the pedal.

As in the first embodiment, the stop pins 54, 56 are spaced by a distance corresponding to the design movement of the pedal between its rest position and its fully depressed position plus the thickness of the pedal at its point of engagement with the stops.

The operation is as for the first embodiment.

The stop pins in either embodiment may be formed by the two free ends of a U-bolt mounted into a plastics stop member.

The pins 25 and 28 of the first embodiment and the pins 54 and 56 of the second embodiment may be replaced by a slot in the stop member into which projects a single pin fixed to the pedal, the forward end of the slot constituting the adjustment abutment and the rear of the slot constituting the pedal stop. As a further alternative two pins on the pedal spaced by an appropriate distance could engage different parts of the stop member.

I claim:

1. A clutch pedal assembly comprising a pedal bracket, a pedal pivotably mounted on the pedal bracket, and a pedal stop member which in use defines the normal position of the pedal, characterised in that the pedal stop member is movable by the pedal upon initial depression of the pedal to a full travel position but restrained against return movement with the pedal whereby the pedal stop member is adjusted to a position in which it defines a normal position for the pedal having predetermined spatial relationship to the full travel position.

2. A clutch pedal assembly as claimed in claim 1, including an adjustment abutment mounted on the pedal stop member and engageable by the pedal upon initial depression thereof to the full travel position whereby the pedal stop member is moved to its correctly adjusted position.

3. A clutch pedal assembly as claimed in claim 2, including ratchet means permitting movement of the pedal stop member upon initial movement of the pedal but preventing movement of the pedal stop member in the opposite direction.

4. A clutch pedal assembly as claimed in claim 3, in which the pedal is mounted on a pedal shaft and the pedal stop member is mounted on the pedal shaft.

5. A clutch pedal assembly as claimed in claim 4, in which the ratchet means comprises a toothed sector on the pedal stop member and a pawl member mounted on the pedal bracket and urged into engagement with the toothed sector.

6. A clutch pedal assembly as claimed in claim 5, including a pawl housing member having a bifurcated end portion apertured to receive the pedal shaft with the pedal stop member located on the shaft within the bifurcated end portion, the pawl being slidable in the housing towards and away from the toothed sector.

7. A clutch pedal assembly as claimed in claim 3, in which the pedal stop member is mounted on the side of the pedal bracket adjacent the pedal in a housing member having a slot defining the position of the pedal stop member relative to pedal bracket in a direction substantially parallel to the direction of movement of an adjacent portion of the pedal engaged by the pedal stop.

8. A clutch pedal assembly as claimed in claim 7, in which the pedal stop member is an elongate member having the pedal stop adjacent one end and the adjustment abutment at the other end, one either side of said adjacent portion of the pedal.

9. A clutch pedal assembly as claimed in claim 3, in which the ratchet means comprises cooperating teeth on the pedal stop member and the housing member, one or both of said members being formed of resilient material.

10. A clutch pedal assembly as claimed in any one of claims 4 to 9, in which the ratchet means can be disengaged to permit resetting of the pedal stop member to a position from which it can be readjusted by depression of the pedal.

* * * * *